US010800409B2

(12) United States Patent
O'Donnell

(10) Patent No.: US 10,800,409 B2
(45) Date of Patent: Oct. 13, 2020

(54) SYSTEMS AND METHODS FOR OPERATING A MOBILE MACHINE USING DETECTED SOUNDS

(71) Applicant: Caterpillar Paving Products Inc., Brooklyn Park, MN (US)

(72) Inventor: Timothy M. O'Donnell, Long Lake, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 0 days.

(21) Appl. No.: 16/120,913

(22) Filed: Sep. 4, 2018

(65) Prior Publication Data

US 2020/0070816 A1 Mar. 5, 2020

(51) Int. Cl.
*B60W 30/09* (2012.01)
*H04R 1/32* (2006.01)
*G05D 1/02* (2020.01)

(52) U.S. Cl.
CPC .......... *B60W 30/09* (2013.01); *G05D 1/0255* (2013.01); *H04R 1/326* (2013.01); *B60W 2300/125* (2013.01); *B60W 2420/54* (2013.01)

(58) Field of Classification Search
USPC ......................................................... 701/23
See application file for complete search history.

(56) References Cited

U.S. PATENT DOCUMENTS

| 5,369,346 | A | 11/1994 | Takahashi et al. | |
|---|---|---|---|---|
| 7,957,837 | B2* | 6/2011 | Ziegler | B25J 5/007 700/258 |
| 8,108,092 | B2* | 1/2012 | Phillips | G05D 1/0033 701/23 |
| 8,248,263 | B2* | 8/2012 | Shervey | G07C 9/20 340/686.1 |
| 8,364,136 | B2* | 1/2013 | Hoffberg | G05B 15/02 340/426.15 |
| 8,520,695 | B1* | 8/2013 | Rubin | G01C 21/26 370/445 |
| 8,818,609 | B1* | 8/2014 | Boyko | B60W 30/00 342/70 |
| 8,892,356 | B1* | 11/2014 | Weiland | G01C 21/3658 701/431 |
| 8,914,139 | B2* | 12/2014 | Badavne | A63H 3/28 180/7.1 |
| 8,996,224 | B1* | 3/2015 | Herbach | G05D 1/0011 180/116 |
| 9,008,890 | B1* | 4/2015 | Herbach | B60W 30/00 701/26 |

(Continued)

FOREIGN PATENT DOCUMENTS

| JP | 2002030699 A | 1/2002 |
|---|---|---|
| WO | 0133134 A1 | 5/2001 |
| WO | 2009155948 A1 | 12/2009 |

*Primary Examiner* — Jean Paul Cass

(74) *Attorney, Agent, or Firm* — Schwegman, Lundberg & Woessner

(57) ABSTRACT

In one aspect, a method for operating a mobile machine may comprise: receiving an audio input from at least one audio sensor coupled to the machine; determining whether the audio input corresponds to a non-ambient sound; determining the direction between the source of the non-ambient sound and the machine; and reacting to the non-ambient sound based on the determined direction.

18 Claims, 4 Drawing Sheets

(56) References Cited

U.S. PATENT DOCUMENTS

| | | | | |
|---|---|---|---|---|
| 9,015,093 B1* | 4/2015 | Commons | ........... | G01C 21/3602 706/26 |
| 9,579,060 B1* | 2/2017 | Lisy | ........... | A61B 5/6803 |
| 9,626,879 B2* | 4/2017 | Manci | ........... | G09B 19/16 |
| 9,661,472 B2* | 5/2017 | Gherardi | ........... | H04W 4/026 |
| 10,198,685 B2* | 2/2019 | Simon | ........... | G06Q 10/0833 |
| 10,296,795 B2* | 5/2019 | Kwant | ........... | G05D 1/0246 |
| 10,309,796 B2* | 6/2019 | Weiland | ........... | G01C 21/26 |
| 10,323,386 B2* | 6/2019 | Kiyota | ........... | E02F 9/262 |
| 10,336,353 B2* | 7/2019 | Carlson | ........... | G01S 19/17 |
| 10,380,473 B2* | 8/2019 | Manci | ........... | G06Q 10/08355 |
| 10,386,792 B2* | 8/2019 | Blayvas | ........... | G01S 13/862 |
| 10,515,521 B2* | 12/2019 | Klein | ........... | G08B 21/02 |
| 10,544,899 B2* | 1/2020 | Hakins | ........... | G08B 13/2414 |
| 2003/0216228 A1* | 11/2003 | Rast | ........... | A63B 21/0087 482/84 |
| 2005/0004753 A1* | 1/2005 | Weiland | ........... | G06F 17/00 701/532 |
| 2008/0027599 A1* | 1/2008 | Logan | ........... | G05D 1/0234 701/23 |
| 2008/0159549 A1* | 7/2008 | Copley | ........... | G10K 11/178 381/58 |
| 2009/0080666 A1* | 3/2009 | Uhle | ........... | H04R 5/04 381/17 |
| 2009/0086993 A1* | 4/2009 | Kawaguchi | ........... | G01S 3/801 381/92 |
| 2009/0299630 A1* | 12/2009 | Denaro | ........... | B60W 30/18009 701/300 |
| 2012/0083959 A1* | 4/2012 | Dolgov | ........... | G05D 1/0214 701/23 |
| 2013/0281765 A1* | 10/2013 | Miller, III | ........... | A61B 5/721 600/25 |
| 2014/0129073 A1* | 5/2014 | Ferguson | ........... | G05D 1/00 701/23 |
| 2015/0165895 A1* | 6/2015 | Menor | ........... | B60K 7/0007 701/23 |
| 2015/0205298 A1* | 7/2015 | Stoschek | ........... | G05D 1/021 701/23 |
| 2015/0360697 A1* | 12/2015 | Baek | ........... | B60W 40/09 701/23 |
| 2017/0069339 A1* | 3/2017 | Braskich | ........... | G10L 25/51 |
| 2017/0139417 A1* | 5/2017 | Reiff | ........... | G06K 9/00798 |
| 2017/0243485 A1* | 8/2017 | Rubin | ........... | H04W 72/005 |
| 2018/0106885 A1* | 4/2018 | Blayvas | ........... | G01S 13/931 |
| 2018/0360664 A1* | 12/2018 | Easter | ........... | A61N 1/36036 |
| 2018/0373941 A1* | 12/2018 | Kwant | ........... | G08G 1/0129 |
| 2019/0099009 A1* | 4/2019 | Connor | ........... | A61B 5/0205 |
| 2019/0208140 A1* | 7/2019 | Wilkinson | ........... | G06T 19/006 |
| 2019/0238741 A1* | 8/2019 | Atkinson | ........... | G01C 3/08 |

* cited by examiner

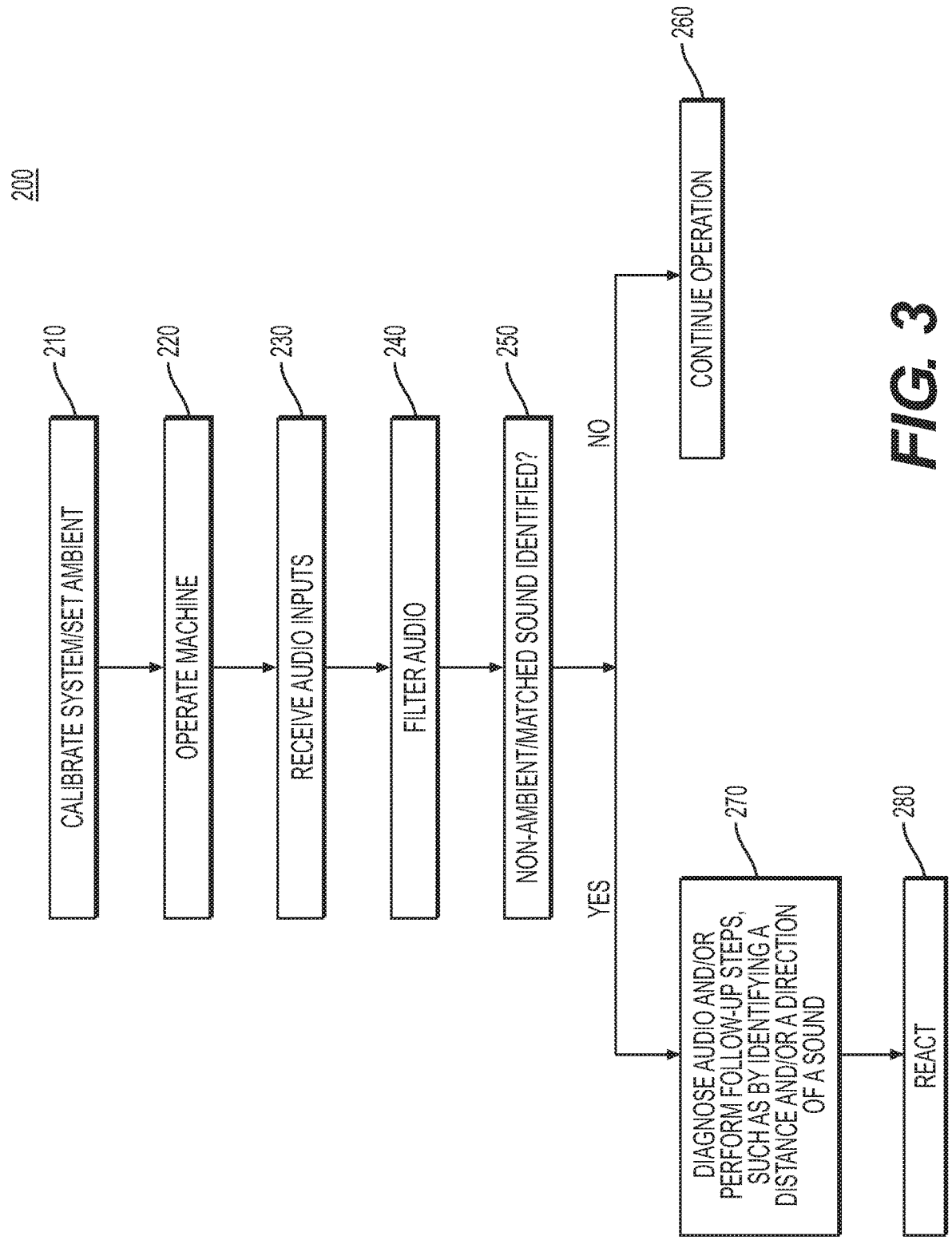

SYSTEMS AND METHODS FOR OPERATING A MOBILE MACHINE USING DETECTED SOUNDS

TECHNICAL FIELD

The present disclosure relates generally to a mobile machine and, more particularly, to systems and methods for operating a mobile machine using detected sounds.

BACKGROUND

Mobile machines are frequently used at work sites. These machines may perform a wide variety of tasks. A machine must operate with awareness of the machine's environment, including other occupants of the work site. A work site may be occupied by numerous stationary and moving elements including people, machines, buildings, and other objects. When a machine is operated by a person in a cab of the machine, the operator may use multiple senses while evaluating the work site environment. For example, in addition to evaluating an environment using sight, an operator may also utilize sounds and sensations in order to evaluate his or her surroundings.

Increasingly, work sites are becoming automated. Machines may be operated automatically or by a remote operator, rather than by an operator in the cab of the machine. In automated work sites, it is important for machines to operate with awareness of the people and objects around them. For example, it may be desirable for a machine to engage with an object such as a material pile. However, the same machine should not physically encounter people or other machines. Machines may possess collision avoidance systems which utilize lasers or other mechanisms for evaluating the surroundings of a machine. However, such systems may have limited ranges and may be less adept at detecting obstacles that are not within the sight line of the machine. For example, such systems may be unable to evaluate obstacles around a corner, behind another object, or over a hill.

Japanese Publication No. JP2002030699A, filed by Komatsu Ltd., and published Jan. 31, 2002, describes a system for a mobile machine that includes a microphone and a controller. The controller may store known sound patterns and may compare a sound received by the microphone to the stored sound patterns. If the microphone detects a sound that matches a reference pattern, then the movement of the machine may be stopped. However, the system of JP2002030699A lacks an ability to evaluate sounds that are not a part of a programmed library. Relying on a programmed library may be limiting due to the system's inability to detect and respond to sounds that are not part of the programmed library. The system of the present disclosure may solve one or more of the problems set forth above and/or other problems in the art. The scope of the current disclosure, however, is defined by the attached claims, and not by the ability to solve any specific problem.

SUMMARY

In one aspect, a method for operating a mobile machine may comprise: receiving an audio input from at least one audio sensor coupled to the machine; determining whether the audio input corresponds to a non-ambient sound; determining the direction between the source of the non-ambient sound and the machine; and reacting to the non-ambient sound based on the determined direction.

In another aspect, a system for operating a mobile machine may comprise: at least one audio sensor coupled to the machine; and a controller configured to: receive an audio input from at least one audio sensor coupled to the machine; determine whether the audio input reflects a non-ambient sound; determine the direction between the source of the non-ambient sound and the machine; and react to the non-ambient sound based on the determined direction.

In yet another aspect. a method for operating a mobile machine may comprise: receiving an audio input from at least one audio sensor coupled to the machine; characterizing the audio input; based on the characterized audio input, focusing one or more collision avoidance sensors; and reacting to characterized audio input.

BRIEF DESCRIPTION OF THE DRAWINGS

FIG. 3 is a flow diagram showing an exemplary control sequence for evaluating environmental sounds using the exemplary control system of FIG. 2.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," substantially," and "approximately" are used to indicate a possible variation of ±10% in the stated value. Although certain aspects of the current disclosure are described with reference to a haul machine, this is only exemplary. In general, the current disclosure can be applied to any machine, such as, for example, any type of truck, loader, scraper, tractor, loader, trencher, excavator, grader, backhoe, dozer, load-haul-dump machine, forklift, crane, roller, etc. While the current disclosure references exemplary placements of sensors, such sensors may be placed in other suitable locations consistent with the present disclosure.

Figure 1A:
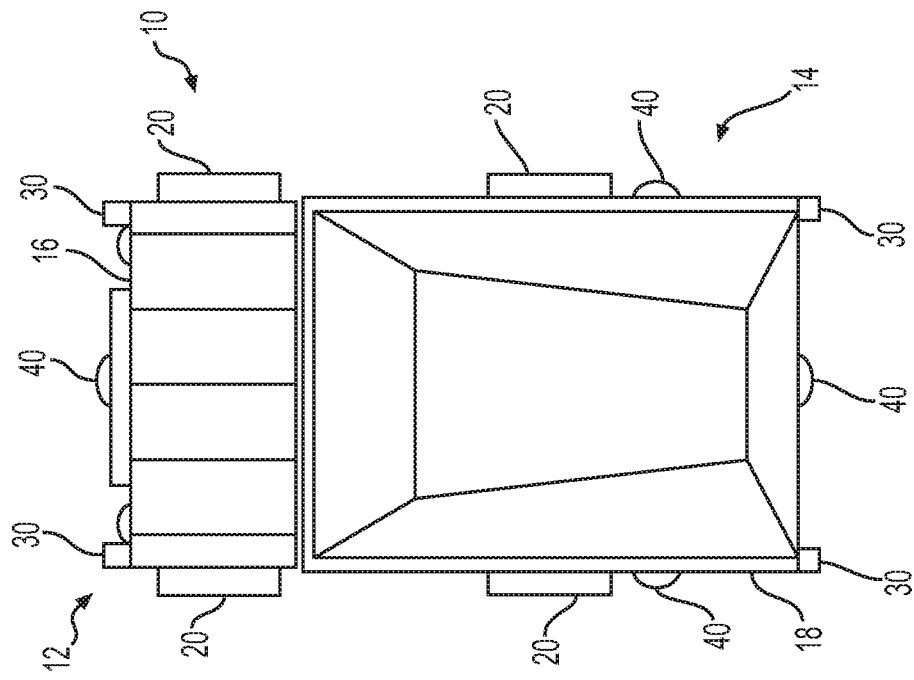
FIGS. 1A-1C are top-view schematic illustrations of exemplary machines.
Figure 1B:
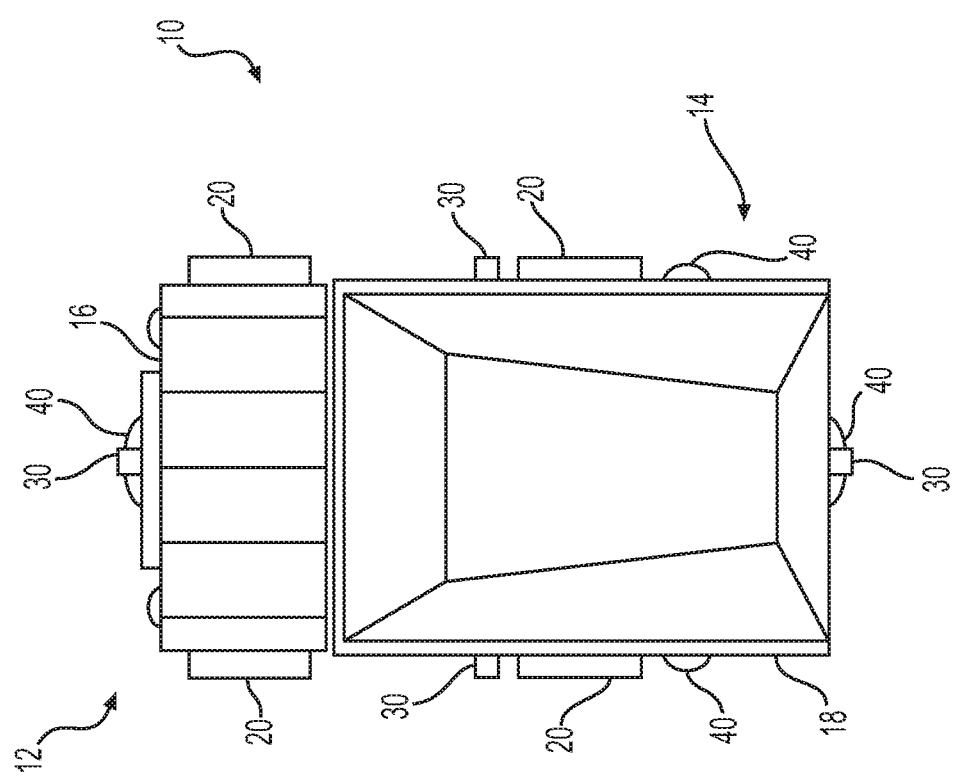
Figure 1C:
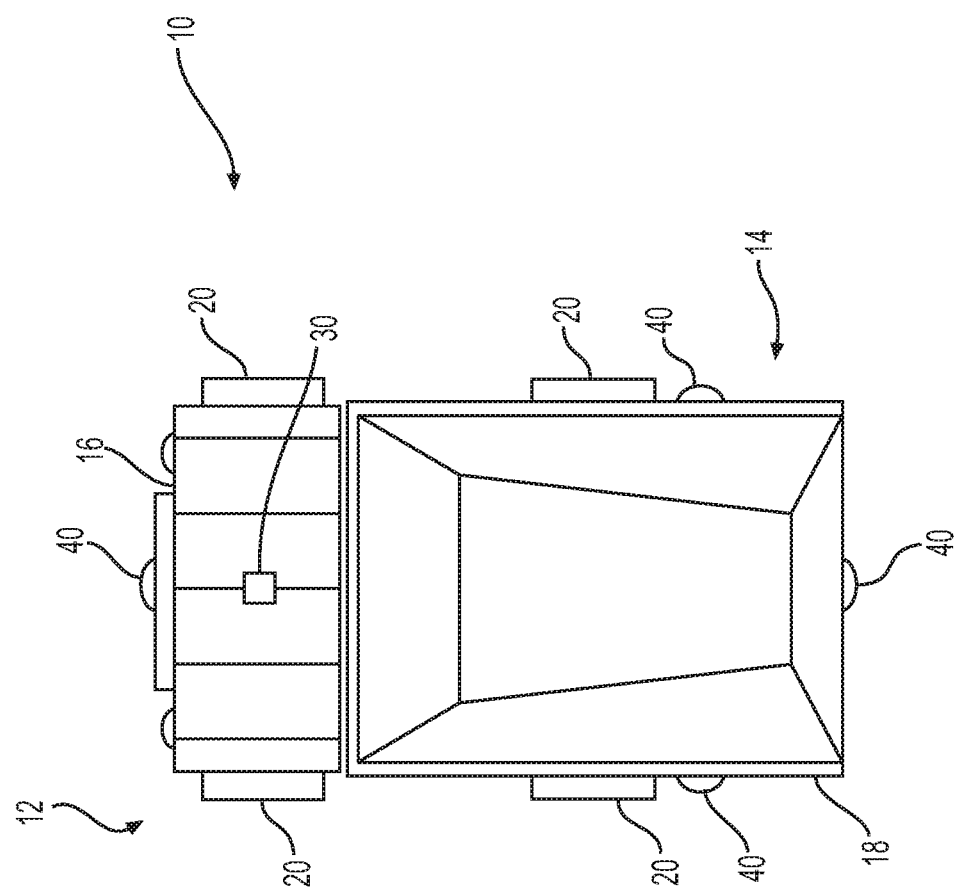

FIGS. 1A-1C depict top views of an exemplary machine 10. Machine 10 may include a front portion 12 and a rear portion 14. Front portion 12 may include an operator cab 16, which may be mounted above an engine enclosure. Operator cab 16 may include a control system having a plurality of inputs and displays. Rear portion 14 may include a dump body 18, which may be pivotally mounted to a frame of machine 10. Machine 10 may be supported on the ground by wheels 20. The elements and layout of machine 10 are merely exemplary. The principles of the present disclosure may be applied to any type of machine, including machines lacking the above components or possessing different components.

Machine 10 may include a one or more audio sensors 30. Audio sensors 30 may be, for example, microphones, geophones, hydrophones, seismometers, sound locators, lace sensors, and/or any other type of audio sensor known in the art. While the term microphone may be used herein, any other suitable type of sensor may also be used. Audio sensors 30 may be configured to take in noise from an environment and to produce an analog or digital signal in response to such noise. A signal from audio sensor 30 may be indicative of various qualities of a noise detected by audio sensor 30. For example, a signal of audio sensor 30 may include information such as amplitude, frequency, wavelength, and/or period of a detected waveform.

Audio sensors 30 may be mounted or otherwise positioned in any suitable positions on machine 10. When a plurality of audio sensors 30 are positioned on machine 10, the signals obtained from audio sensors 30 may be compared and/or combined in order to obtain further information about a sound detected by audio sensors 30. An audio sensor 30 positioned at a first position may collect data indicative of certain characteristics of a detected sound (e.g., amplitude, frequency, wavelength, and/or period). An audio sensor 30 positioned at a second position may also collect data indicative of certain characteristics (such as those described above) of the same detected sound. The data collected by the audio sensors 30 at the first position and the second position may differ in one or more characteristics. For example, a signal from an audio sensor 30 at a first position may reflect a sound wave with an amplitude larger than a signal from audio sensor 30 at a second position. Such information may be suggestive that a source of the detected sound is closer to the first position than to the second position. Changes in signals from audio sensors 30 over time may further be indicative of a position or a change in position of a sound source. For example, a signal from audio sensor 30 may be compared to a signal from audio sensor 30 at a different time in order to identify whether a sound is, for example, closer or further away. Data from multiple audio sensors 30 may be combined to further characterize the changes in a sound over time. Signals from audio sensors 30 at different positions may vary in a variety of ways to indicate, for example, different frequencies, different amplitudes, different wave components, etc. Differences and similarities among signals from audio sensors 30 at different positions may be indicative of a type sound source, a distance from a sound source, a movement of a sound source, etc.

Audio sensors 30 may be positioned so as to provide information such as that described above regarding a sound source. Audio sensors 30 may be positioned on a machine 10 and spaced apart from one another. FIG. 1A depicts one exemplary configuration. As shown in FIG. 1A, an audio sensor 30 may be placed on each side of machine 10. In an alternative, audio sensors 30 may be placed on a subset of the sides of machine 10. For example, audio sensors 30 may be placed on three sides of machine 10. In an alternative, audio sensors 30 may be placed on two adjacent or opposite sides of machine 10, or one audio sensor 30 may be placed on a side of machine 10. FIG. 1B depicts an alternative configuration of audio sensors 30. As shown in FIG. 1B, audio sensors 30 may be placed at each corner of machine 10, or at a subset of the corners of machine 10. Alternatively, audio sensors 30 may be placed at corners of machine 10 and on sides of machine 10. Any combination of side and/or corner audio sensors 30 may be used on machine 10.

FIG. 1C depicts an alternative configuration using one audio sensor 30 on machine 10. A single audio sensor 30 may be configured to determine a directional source of a sound without information obtained from other audio sensors 30. For example, audio sensor 30 may be a directional microphone. Only one audio sensor 30 configured to determine a direction of a sound may be used, or multiple such audio sensors 30 may be used. Alternatively, one or more audio sensors 30 configured to determine a direction of a sound may be used in conjunction with audio sensors 30 that are not so configured. Where a directional audio sensor 30 is used, such an audio sensor 30 may be placed on any suitable portion of a machine 10. For example, an audio sensor 30 may be placed on a central portion of machine 10 such as a top central portion of machine 10.

As shown in FIGS. 1A-1C, machine 10 may also include one or more collision avoidance sensors 40. Collision avoidance sensors 40 may comprise a collision avoidance system. While FIGS. 1A-1C depict collision avoidance sensors 40 as being positioned on sides of machine 10, such a configuration is merely exemplary. Any number and configuration of collision avoidance sensors 40 may be used. Collision avoidance sensors 40 may be any appropriate type of sensor. For example, collision avoidance sensors may be light detection and ranging (LIDAR) sensors, radar sensors, ultrasonic sensors, camera-based systems (e.g., monocular or stereo cameras), traditional (single beam) lasers, and/or thermal sensors. Alternatively, any other suitable type of sensors may be used. Sensors 40 may be capable of being focused in a particular direction. Collision avoidance sensors 40 may be used to determine a distance between a sensor 40 and an object in the vicinity of machine 10. Thus, collision avoidance sensors 40 may be configured to assist machine 10 in avoiding a collision with another object.

Figure 2:
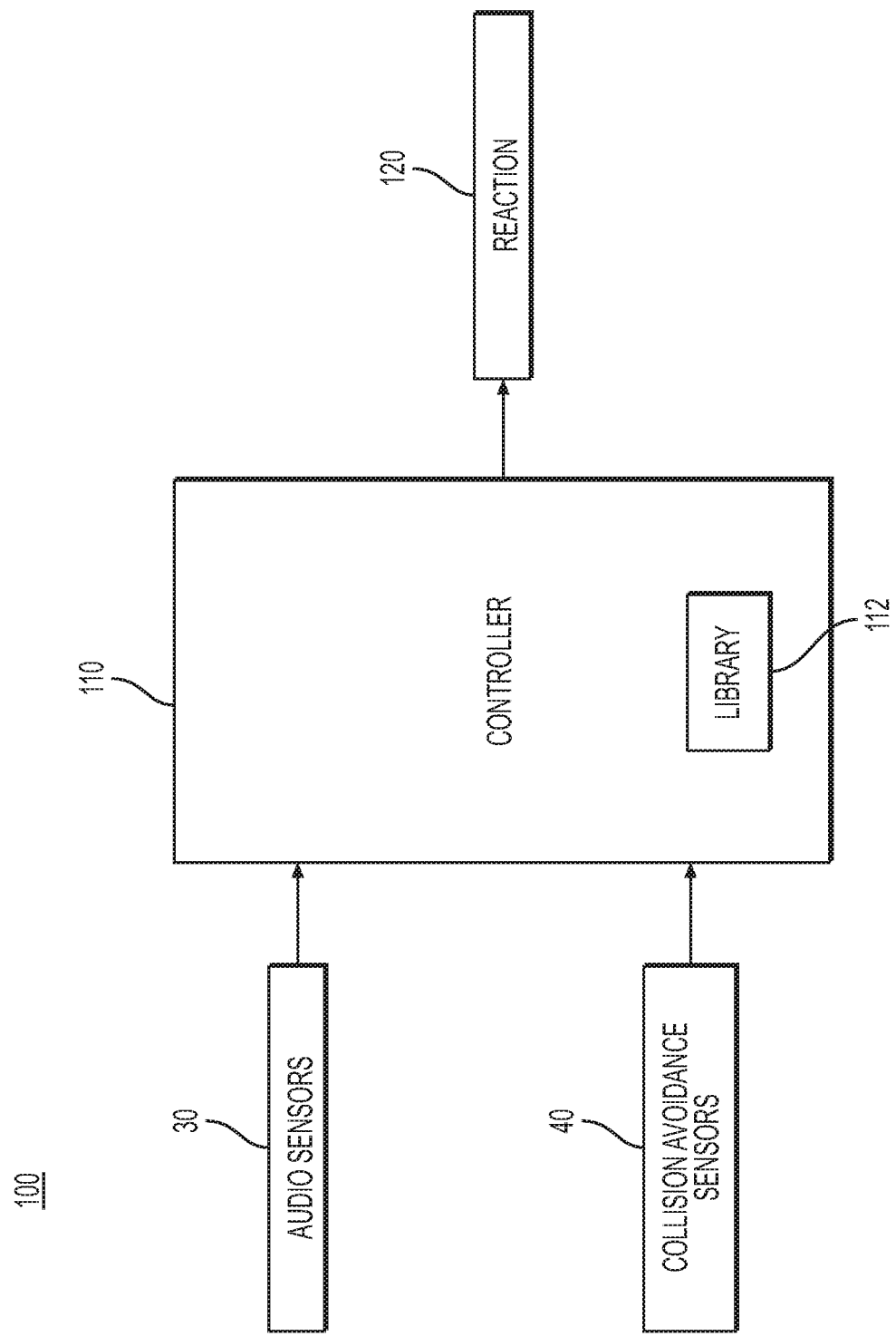
FIG. 2 is a block diagram of an exemplary control system for the machines of FIGS. 1A-1C.

FIG. 2 depicts an exemplary control system 100 for machine 10. Control system 100 may include a controller 110. Controller 110 may embody a single microprocessor or multiple microprocessors that may include means for monitoring operations of machine 10, issuing instructions to components of machine 10, and/or communicating with external devices. For example, controller 110 may include a memory, a secondary storage device, a clock, and a processor, such as a central processing unit or any other means for accomplishing a task consistent with the present disclosure. The memory or secondary storage device associated with controller 110 may store data and/or software routines that may assist controller 110 in performing its functions. Further, the memory or storage device associated with controller 110 may also store data received from various inputs associated with work machine 10. Numerous commercially available microprocessors can be configured to perform the functions of controller 110. It should be appreciated that controller 110 could readily embody a general machine controller capable of controlling numerous other machine functions. Various other known circuits may be associated with controller 110, including signal-conditioning circuitry, communication circuitry, hydraulic or other actuation circuitry, and other appropriate circuitry.

Controller 110 may receive information from inputs including audio sensors 30 and collision avoidance sensors 40. Audio sensor 30 may have any of the properties described above. Audio sensor 30 may provide controller 110 with information pertaining to noises from a vicinity of machine 10. Signals from audio sensor 30 may be digital signals or analog signals. Signals from audio sensors 30 may comprise one or more signals from one or more audio sensors 30. Collision avoidance sensors 40 may have any of the properties described above. Collision avoidance sensors 40 may provide controller 30 and/or machine 10 with information regarding whether any objects are proximate to collision avoidance sensors 40.

Controller 110 or another component may be configured to use signals from audio sensor(s) 30 to determine a location of a sound detected by audio sensor(s) 30. For example, controller 110 may determine a direction from which a sound is emitted. A direction determined by controller may be, for example, a quadrant or other sector of machine 10 (e.g., a front sector, a rear sector, a left sector, a right sector, a right front quadrant, a left front quadrant, etc.). Controller 110 may determine locational information by comparing and/or combining signals from multiple audio sensors 30. Where a directional microphone or other directional audio sensor 30 is used, a signal from one audio sensor 30 may be indicative of a location of a source of a sound. Controller 110 may also use inputs from audio sensors 30 to approximate or determine a distance between machine 10 and a noise source. Controller 110 may also use inputs from audio sensors 30 to determine a relative angular position of an object. The following directions may be defined relative to a forward-facing operator in a cab of machine 10: 0 degrees may be defined as a forward direction, 90 degrees may be defined as a rightward direction, 180 degrees may be defined as a backward direction, and 270 degrees may be identified as a leftward direction. The four directions above may all be at right angles to one another. Controller 110 may use inputs from audio sensors 30 in order to assign a directional value from 0 degrees to 360 degrees, using the coordinate system described above. The accuracy of such a measurement may be within approximately +/−30 degrees.

Controller 110 may also be capable of discerning particular sounds based on waveforms measured by one or more audio sensors 30. Controller 110 may be configured to compare a detected audio to a library 112 and to catalog a detected sound based on type. Library 112 may be stored on controller 110 and/or may be accessed remotely by controller 110. For example, controller 110 may be configured to detect an audio command such as a word (e.g., "STOP") or to determine whether detected audio is a result of a machine, a human, or an ambient sound. An ambient sound may be a sound that is a normal, typical, or other type of background noise that is not indicative of a nearby object, such as a machine or human. For example, ambient sounds may result from wind, traffic, the operating sounds of machine 10 itself, or other types of background sounds. Ambient sounds may depend on environment. For example, in a worksite near a highway, traffic noises may be part of the ambient sound. In a worksite near a busy pedestrian walkway, certain levels of voices may be a part of the ambient sound. A non-ambient sound may be any sound that is not a part of the normal background in which machine 10 is operated. Ambient sound may pertain to sounds that do not occur on the worksite itself and/or are not suggestive of a nearby obstacle. In contrast, a non-ambient sound may be a sound that is not part of the normal background in which machine 10 operates. For example, a non-ambient sound may be a sound indicative of people and/or machines on a worksite itself. Ambient sounds may be characterized by a decibel level or other indicator of a sound's amplitude. Additionally or alternatively, ambient sounds may be characterized by particular wave signatures of the worksite environment. Non-ambient sounds may be identified by comparison to stored data regarding an ambient sound in a worksite. For example, non-ambient sounds may have a higher decibel level or amplitude and/or a different wave signature than ambient sounds. Controller 110 may be able to determine what type of source is producing a sound. Controller 110 may also possess machine learning capabilities so that, over time, controller 110 may gain an ability to distinguish among sources of sounds. Controller 110 may learn the sounds associated with a particular work environment. Information may be compiled from numerous controllers 110 so that a library (such as library 112) of sounds may be developed.

Controller 110 may be configured to output reactions 120 based on inputs from audio sensors 30 and/or collision avoidance sensors 40. For example, controller 110 may be configured to provide an alert to an operator, to stop a machine 10, to reverse a machine 10, to slow down a machine 10, to change a direction of machine 10, and/or to otherwise alter a behavior of machine 10. Such possible reactions 120 will be discussed in further detail with regard to FIG. 3.

FIG. 3 depicts an exemplary method 200 for evaluating environmental sounds and responding appropriately. Method 200 may integrate data obtained from audio sensors 30 and/or collision avoidance sensors 40. In performing the steps of method 200, machine 10 may be operated with or without assistance of an operator. Machine 10 may be automated so as to not require an operator cab 16 and/or an operator seated in operator cab 16. Machine 10 may be operated at a variety of job sites including a variety of environmental sounds. In operation, machine 10 may be working in proximity to people, other machines, and other objects. It may be desirable for machine 10 to encounter some of these objects. For example, machine 10 may encounter a pile of material to be dug and/or relocated. On the other hand, collision with other objects or with humans should be avoided.

In step 210, a system such as control system 100 may be calibrated. For example, system 100 may be calibrated based on an ambient environment, and audio sensors 30 may measure an ambient, "zero," or baseline value. When machine 10 is in operation, sounds detected by audio sensors 30 may be compared to the baseline, ambient value. An ambient noise level may be measured each time a machine 10 is used at a new worksite, each morning, each week, or at any other suitable time interval. Such calibration may be done automatically or manually. A remote operator may periodically evaluate a work site and perform a calibration or zeroing reading. Re-calibration may be performed when, for example, an aspect of a work site changes. For example, calibration may be performed at different times during a given day if traffic patterns around a work site change or if a sound environment otherwise changes. Additionally or alternatively, calibration may be performed during manufacture of system 100, controller 110, or machine 10. For example, system 100 may be manufactured with one or more preset ambient noise levels. Where system 100 is manufactured with more than one preset ambient noise level, a user may select an appropriate ambient noise level in step 210.

In step 230, a component of system 100 such as controller 110 may receive audio inputs from the environment around machine 10. For example, controller 110 may receive audio inputs via audio sensor(s) 30. Received audio inputs may be obtained from any of the audio sensor 30 configurations described above or from any alternative configuration of audio sensor(s) 30.

In step 240, a component of system 100 such as controller 110 may filter audio received in step 230. Any suitable filtering method or mechanism may be utilized. For example, controller 110 may utilize the ambient noise level calibrated in step 210 in order to filter audio. Controller 110 may filter out audio inputs from step 230 in order to identify portions of the audio inputs that are not resulting from ambient noise by, for example, comparing audio inputs from step 230 to the ambient noise level calibrated in step 210. Such filtering may cause controller 110 to identify sounds that are not the normal background noises of a work environment. In step 250, a component of system 100 such as controller 110 may determine whether or not a non-ambient sound has been identified. Additionally or alternatively, controller 110 may compare the filtered audio to a library of sounds (such as library 112 described above with regard to FIG. 2) in order to determine whether a sound matching the library has been identified. For example, controller 110 may determine whether a command (e.g., "STOP") has been given to machine 10. If no such non-ambient or matched sound is identified in step 250, then a machine may continue its operation in step 260 without intervention from controller 110.

If, in step 250, a non-ambient or matched sound is identified, then controller 110 may diagnose the audio and/or perform follow-up steps in step 270. For example, controller 110 may attempt to identify a type and/or source of a sound using audio sensors 30 and/or other sensors. Controller 110 may rely on data from audio sensors 30 and/or other sensors, as well as a pre-programmed sound library or sound library built from machine learning (such as library 112), in order to determine the source of a sound (e.g., machine, human, etc.), a direction of a sound, and/or a distance from a sound. Combining data from multiple audio sensors 30 may serve a triangulation effect in determining the source of a sound, as discussed above with regard to FIG. 2. When a machine is moving, changes in sound volume from one or more audio sensors 30 may be indicative of a direction of and/or distance from a sound. For example, the volume of a sound increasing as machine 10 moves forward may indicate that a source of a sound is disposed roughly in front of machine 10. As described above, controller 110 may use inputs from audio sensors 30 in order to assign a directional value from 0 degrees to 360 degrees, using the coordinate system described above. The accuracy of such a measurement may be within approximately +/−30 degrees. Accuracy of such a measurement may also be higher.

Controller 110 may also engage other systems of machine 10 in order to obtain further information about a source of a sound. For example, controller 110 may utilize collision avoidance sensors 40 in further evaluating a source of a sound. Using audio sensors 30, controller 110 may determine a direction from which a sound is originating. Based on that information, controller 110 may focus collision avoidance sensors 40 in that direction. For example, controller 110 may instruct the collision avoidance sensors 40 to aim or to focus in that direction. Additionally or alternatively, controller 110 may focus a collision avoidance system (including collision avoidance sensors 40) by directing processing power of controller 110 to the operation of collision avoidance sensors 40 in a direction of a detected sound. Such an increase in processing power may result in increased detecting ability from those collision avoidance sensors 40. For example, controller 110 may instruct an increased sampling rate from collision avoidance sensors 40, or controller 110 may more deeply analyze data collected by collision avoidance sensors 40. Collision avoidance sensors 40 may provide additional information regarding a location of objects around machine 10, including a source of a sound identified in step 250. For example, collision avoidance sensors 40 may provide information about a more precise location of an object and/or about a distance between the object and machine 10. Collision avoidance sensors 40 may be used in conjunction with audio sensors 30 in order to evaluate potential obstacles. A video or other type of visual display (such as a schematic display) may be provided to an operator reflecting a setting in the direction of the observed sound. For example, the video or other visual display may show objects in the direction of the observed sound and may provide further information about nearby obstacles. Additionally or alternatively, an automated video and/or other visual diagnosis may be performed by controller 110, based on automated recognition of an object in a video or other visual display. For example, if collision avoidance sensors 40 detect an object but that object is not producing noise detectable by audio sensors 30, then controller 110 may perform further evaluation of the object. For example, diagnostics (such as video diagnostics described above or information from collision avoidance sensors 40) may determine that a detected object is a person, inoperable machine, building, or other structure that should be avoided. Alternatively, the data from audio sensors 30, collision avoidance sensors 40, and/or other sources (such as video) may evaluate that the object is a pile or other object that machine 10 should engage with. Combination of different types of sensor systems, such as audio sensor systems and collision avoidance sensor systems, may allow for a sophisticated, multi-layer approach to detecting obstacles in an automated environment.

After diagnosing the audio and/or performing follow-up steps in step 270, a component of system 100 (such as controller 110) may react to the diagnosis in step 280. For example, controller 110 may issue an alert to an in-cab or remote operator of machine 10. Additionally or alternatively, controller 110 may stop, reverse, alter a direction of, slow down, or otherwise change a motion of machine 10. If, in steps 250 and/or 270, a sound is matched to a library of machine commands (e.g., a "STOP" command), controller 110 may instruct machine 10 to carry out that given command.

INDUSTRIAL APPLICABILITY

The disclosed aspects of the system 100 described herein may be used in order to evaluate whether obstacles are proximate to machine 10. For example, system 100 may determine whether objects are in a path of machine 10. In particular, system 100 may be useful in the field of automation and autonomous operation of machines. Whereas in-cab operators have the ability to listen to the work site around them and to evaluate obstacles aurally, current automated or autonomous machines 10 may lack an audio dimension of analyzing obstacles. Audio information may provide details that are not available via existing collision avoidance systems. For example, collision avoidance systems may be unable to evaluate obstacles which are around a corner, over a hill, or behind another object. In contrast, audio sensors 30 may be able to detect such objects. System 100 may have particular utility in the context of busy or crowded worksites, where numerous machines are at work, where there are people at the worksite, or where there are other obstacles to be avoided.

It will be apparent to those skilled in the art that various modifications and variations can be made to the disclosed system without departing from the scope of the disclosure. Other embodiments of the system will be apparent to those skilled in the art from consideration of the specification and practice of the machine disclosed herein. It is intended that the specification and examples be considered as exemplary only, with a true scope of the disclosure being indicated by the following claims and their equivalents.

What is claimed is:

1. A method for operating a mobile machine having a ground engaging implement, comprising:

receiving a first audio input from at least one audio sensor coupled to the machine;
comparing a second audio input received from the at least one audio sensor to the first audio input;
   comparing the second audio input to
   a library of known sounds;
   after receiving the second audio input,
   receiving a third audio input from the at least one audio;
   comparing a fourth audio input received from
   the at least one audio sensor to the third audio input;
   comparing the fourth audio input to
   the library of known sounds;
   using the comparison of the fourth audio input to the library of known sounds, determining
whether the fourth audio input corresponds to a non-ambient sound;
determining a direction of a source of the non-ambient sound relative to the machine; and reacting to the non-ambient sound based on the determined direction.

2. The method of claim 1, wherein the at least one audio sensor comprises a plurality of audio sensors, and wherein determining the direction includes compiling audio inputs from the plurality of audio sensors.

3. The method of claim 2, wherein the plurality of audio sensors are coupled to different sides and/or different corners of the machine.

4. The method of claim 1, wherein the at least one audio sensor includes a directional microphone.

5. The method of claim 1, further comprising:
   receiving an input from a collision avoidance sensor;
   using the input from the collision avoidance sensor, determining a location of the source of the non-ambient sound relative to the machine; and
   wherein the reacting occurs automatically, without intervention from an operator, based on the determined direction and location, wherein the reacting includes at least one of stopping the machine, changing a speed of the machine, or changing a direction of the machine.

6. The method of claim 4, further comprising focusing the collision avoidance sensor based on the determined direction.

7. The method of claim 1, wherein the first audio input indicates an ambient sound level in an environment of the machine.

8. The method of claim 1, wherein the reacting includes at least one of stopping the machine, changing a speed of the machine, or changing a direction of the machine, and wherein the reacting occurs automatically without input from an operator.

9. A system for operating a mobile machine having a ground engaging implement, comprising:
   at least one audio sensor coupled to the machine;
   a collision avoidance sensor; and
   a controller configured to:
      receive a first audio input from the at least one audio sensor;
      comparing a second audio input to the first audio input;
      receiving a third audio input from the at least one audio;
      comparing a fourth audio input to the third audio input;
      comparing the fourth audio input to a library of known sounds;
      using the comparison of the fourth audio input to the library of known sounds, determining whether the fourth audio input corresponds to a non-ambient sound;
      receive an input from the collision avoidance sensor;
      upon determining that the fourth audio input reflects the non-ambient sound, using the input from the collision avoidance sensor and the fourth audio input, determine a direction of a source of the non-ambient sound relative to the machine; and
      automatically react to the non-ambient sound based on the determined direction, wherein the automatic reaction includes at least one of stopping the machine, changing a speed of the machine, or changing a direction of the machine.

10. The system of claim 9, wherein the at least one audio sensor is a plurality of audio sensors, wherein the plurality of audio sensors are coupled to different sides and/or different corners of the machine.

11. The system of claim 9, wherein the controller is further configured to focus the collision avoidance sensor based on the determined direction and to determine a location of the source of the non-ambient sound relative to the machine.

12. The method of claim 9, wherein the at least one audio sensor includes a directional microphone.

13. A method for operating a mobile machine having a ground engaging element, comprising:
   calibrating at least one audio sensor coupled to the machine, wherein the calibrating includes measuring an ambient sound level in an environment of the machine with the at least one audio sensor;
   receiving a plurality of audio inputs from the at least one audio sensor coupled to the machine;
   characterizing the plurality of audio inputs by comparing the plurality of audio inputs to the measured ambient sound level;
   comparing the characterized plurality of audio inputs to a library of known sounds;
   based on the characterized plurality of audio inputs, focusing one or more collision avoidance sensors; and
   based on an input from the focused one or more collision avoidance sensors and the characterized plurality of audio inputs, automatically reacting, wherein the reacting includes at least one of stopping the machine, changing a speed of the machine, or changing a direction of the machine.

14. The method of claim 13, wherein the at least one audio sensor comprises a plurality of audio sensors, and wherein characterizing the audio input includes compiling the audio inputs from the plurality of audio sensors.

15. The method of claim 5, wherein the collision avoidance sensor includes at least one of a light detection and ranging sensor, a radar sensor, an ultrasonic sensor, a laser, or a thermal sensor.

16. The system of claim 9, wherein the collision avoidance sensor includes at least one of a light detection and ranging sensor, a radar sensor, an ultrasonic sensor, a laser, or a thermal sensor.

17. The method of claim 13, wherein the audio input is a first audio input, wherein the ambient sound level is a first ambient sound level, and wherein the method further includes:
   after receiving the first audio input, re-calibrating the at least one audio sensor coupled to the machine, wherein the re-calibrating includes measuring a second ambient sound level in the environment of the machine with the at least one audio sensor;
   receiving a second audio input from the at least one audio sensor coupled to the machine; and characterizing the second audio input by comparing the second audio input to the second measured ambient sound level.

18. The method of claim 13, wherein the collision avoidance sensor includes at least one of a light detection and ranging sensor, a radar sensor, an ultrasonic sensor, a laser, or a thermal sensor.

\* \* \* \* \*